United States Patent [19]
Kanetsuna et al.

[11] Patent Number: 5,229,064
[45] Date of Patent: Jul. 20, 1993

[54] FLUIDIZED BED TYPE PRELIMINARY REDUCING FURNACE FOR OXIDE RAW MATERIAL

[75] Inventors: Teruo Kanetsuna; Kazuo Kimura, both of Tokyo, Japan

[73] Assignee: Kawasaki Steel Corporation, Kobe, Japan

[21] Appl. No.: 730,857

[22] PCT Filed: Dec. 27, 1990

[86] PCT No.: PCT/JP90/01719

§ 371 Date: Jul. 19, 1991

§ 102(e) Date: Jul. 19, 1991

[51] Int. Cl.$^5$ .................................................. C22B 5/14
[52] U.S. Cl. ........................................ 266/172; 75/444
[58] Field of Search ........................... 266/172; 75/444; 34/57 A; 432/58; 422/145, 143, 139

[56] References Cited

U.S. PATENT DOCUMENTS

Re. 33,230  6/1990  Engstrom et al. ..................... 432/58
2,287,476  6/1942  Hodson et al. ........................ 266/172

FOREIGN PATENT DOCUMENTS 58-217615 12/1983 Japan .
140313  8/1984 Japan .

*Primary Examiner*—Melvyn J. Andrews
*Attorney, Agent, or Firm*—Dvorak and Traub

[57] ABSTRACT

A fluidized bed reducing furnace for an oxide raw material is provided with at least two reductive gas supply ports for supplying a reductive gas into the furnace. With this construction, the fine or granular raw material and the reductive gas supplied are sufficiently dispersed and mixed with each other in the furnace to thereby improve a reduction rate and an yield of the raw material. It is preferable to provide at least two raw material supply ports for supplying the raw material into the furnace.

4 Claims, 9 Drawing Sheets

FLUIDIZED BED TYPE PRELIMINARY REDUCING FURNACE FOR OXIDE RAW MATERIAL

TECHNICAL FIELD

The present invention relates to a fluidized bed reducing furnace to be employed for preliminary reduction of an oxide raw material to be carried out before melt reduction of the oxide raw material.

BACKGROUND ART

Recent resources of an oxide raw material tend to be reduced in grade. To improve the grade, the low-grade raw material has been concentrated to a fine or granular raw material by ore dressing.

As a method of producing metal or alloy from the fine or granular raw material, it is known that the fine or granular raw material is first preliminarily reduced, and is thereafter melt reduced to produce the metal or the alloy. A known system for preliminarily reducing the fine or granular raw material employs a rotary furnace or a fluidized bed furnace. The fluidized bed furnace has the following advantages in comparison with the rotary furnace.

(1) Temperature control is precisely carried out to thereby prevent formation of a mass of the fine or granular raw material due to local heating.

(2) A processing capacity in relation to an installation area is large.

Accordingly, it is expected that the fluidized bed furnace will be increasingly employed.

In general, the fine or granular raw material has a maximum particle size of 3 mm, and it also contains a powder having a particle size of 0.1 mm. The fine or granular raw material is fluidized by a reductive gas flowing at a velocity of 2-10 m/sec in a fluidized bed. In the case of producing a preliminarily reduced raw material at a rate of 100 t/day, a necessary size of the furnace is 2-6 m in inner diameter and 10-30 m in height. In order to carry out a preliminary reducing reaction uniformly and efficiently, the fine or granular raw material and the reductive gas supplied need to be sufficiently dispensed and mixed with each other.

A known fluidized bed reducing furnace is disclosed in Japanese Patent Laid-open Publication No. 58217615, for example. This prior art furnace is a small-sized furnace having an inner diameter of about 1 m, and it includes a single raw material supply port and a substantially single reductive gas supply port. In this type furnace, it is difficult to sufficiently disperse and mix the raw material particles and the reductive ga with each other. Accordingly, in the development of a large-sized fluidized bed reducing furnace capable of producing a large amount of preliminarily reduced ore, there has been demanded a fluidized bed type preliminary reducing furnace of a type capable of sufficiently disperse and mix the raw material particles and the reductive gas with each other.

SUMMARY OF THE INVENTION

It is accordingly an object of the present invention to provide a fluidized bed reducing furnace which can sufficiently disperse and mix a fine or granular raw material and a reductive gas supplied with each other, thereby meeting the above requirement.

According to a first technical means of the present invention, there is provided a fluidized bed reducing furnace for an oxide raw material comprising at least two raw material supply ports provided at a lower portion of a side wall of said furnace for supplying said raw material into said furnace, and at least two reductive gas supply ports provided below said raw material supply ports for supplying a reductive gas into said furnace. In this construction, it is preferable that an inner diameter of a reductive gas supply section of said furnace provided with said reductive gas supply ports is set to be smaller than an inner diameter of a raw material supply section of said furnace provided with said raw material supply ports.

According to a second technical means of the present invention, there is provided a fluidized bed reducing furnace for an oxide raw material comprising at least two reductive gas supply ports provided at a bottom of said furnace and distributed uniformly at the same level for supplying a reductive gas into said furnace, and gas dispersing devices provided at reductive gas outlet of said reductive gas supply ports respectively.

According to a third technical means of the present invention, there is provided a fluidized bed reducing furnace for an oxide raw material comprising at least two upper reductive gas supply ports provided at a lower portion of said furnace for supplying a reductive gas into said furnace, at least two lower reductive gas supply ports provided below said upper reductive gas supply ports for supplying said reductive gas into said furnace, and at least two raw material supply ports provided at an intermediate level between a level of said upper reductive gas supply ports and a level of said lower reductive gas supply ports for supplying said raw material into said furnace.

According to a fourth technical means of the present invention, there is provided a fluidized bed reducing furnace comprising at least two raw material supply ports provided at a lower portion of a side wall of said furnace for supplying said raw material into said furnace, and at least two reductive gas supply ports provided below or above said raw material supply ports for supplying a reductive gas into said furnace as swirling said reductive gas.

Examples of the oxide raw material may include iron ore, chrome ore, collected iron dust, etc.

BEST MODE FOR EMBODYING THE INVENTION

The first technical means of the present invention comprises at least two raw material supply ports for supplying a raw material into a furnace and at least two reductive gas supply ports provided below the raw material supply ports for supplying a reductive gas into the furnace. With this construction, the raw material and the reductive gas can be supplied from plural positions, and the reductive gas can be supplied from the underside of the raw material. Accordingly, the raw material and the reductive gas can be sufficiently dispensed and mixed with each other.

Figure 1:
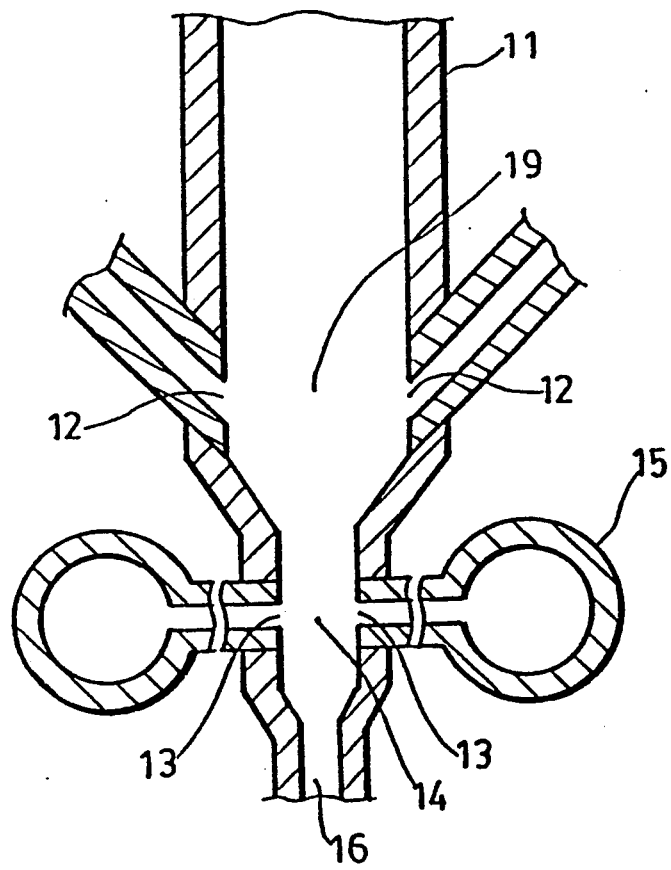
FIG. 1 is a vertical sectional view of a lower part of a preferred embodiment according to the first technical means of the present invention.

FIG. 1 is a vertical sectional view of a lower part of a preferred embodiment according to the first technical means of the present invention.

Referring to FIG. 1, reference numeral 11 designates a reducing furnace, and reference numerals 12 designate two raw material supply ports provided at a lower portion of a side wall of the preliminary reducing furnace 1 and arranged symmetrically at two positions of the same level. An oxide raw material is supplied from the raw material supply ports 2 into a raw material supply section 19 defined in the reducing furnace 11.

Reference numerals 13 designate two reductive gas supply ports provided at a portion of the side wall of the reducing furnace 11 below the raw material supply ports 12 and arranged symmetrically at two positions of the same level. A reductive gas is supplied from two reductive gas supply pipes 15 through the two reductive gas supply ports 13 into a reductive gas supply section 14 defined below the raw material supply ports 12 in the reducing furnace 11. Reference numeral 16 designates an extraction port for extracting a raw material falling from a fluidized bed in the reducing furnace 11.

According to the first technical means, at least two reductive gas supply ports are necessarily provided below at least two raw material supply ports. The number and the position of the reductive gas supply ports and the raw material supply ports to be installed are suitably decided in consideration of a size of the furnace, for example. It is to be noted that the number and the position of the reductive gas supply ports and the raw material supply ports to be installed are not limited to those adopted in this preferred embodiment. The more the number of these ports and the more uniformly the positions of these ports are distributed, the better the raw material and the reductive gas supplied are dispensed and mixed with each other.

According to the first technical means, the raw material is supplied into the furnace from the plural raw material supply ports located above the plural reductive gas supply ports. Accordingly, the dispersion and the mixing of the raw material and the reductive gas can be improved.

In this preferred embodiment, an inner diameter of the reductive gas supply section 14 is set to be smaller than an inner diameter of the raw material supply section 19. With this construction, an upward flow velocity of the reductive gas at a bottom portion of the fluidized bed can be increased to thereby reduce a quantity of the raw material falling from the fluidized bed, thus improving an yield of the raw material. The inner diameter of the reductive gas supply section 14 is suitably decided in consideration of a particle size distribution of the raw material to be used, for example.

The second technical means of the present invention comprises at least two reductive gas supply ports distributed uniformly at the same level of the bottom of the furnace and a gas dispersing device provided at a gas outlet of each reductive gas supply port. With this construction, a reductive gas supplied from the reductive gas supply ports can be dispensed uniformly at the same level.

Figure 3:
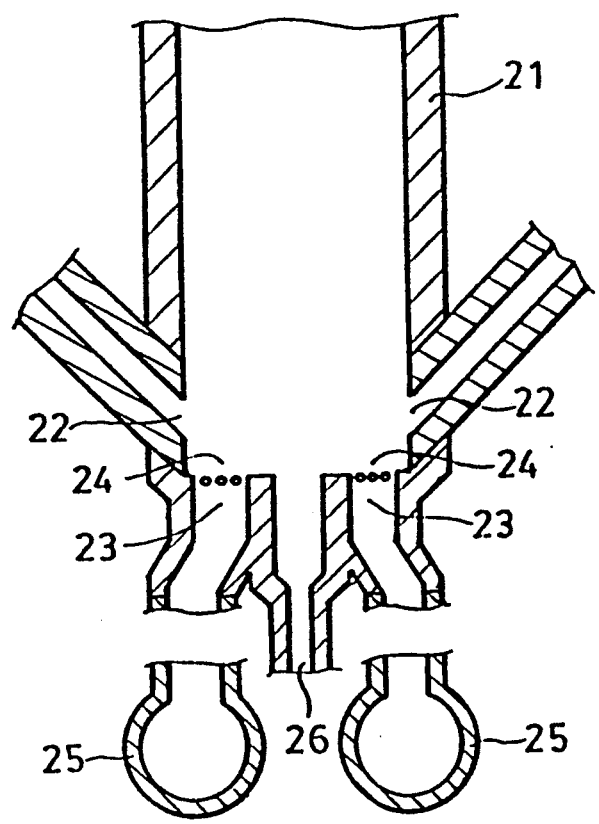
FIG. 3 is a vertical sectional view of a lower part of a preferred embodiment according to the second technical means of the present invention.

FIG. 3 is a vertical sectional view of a lower part of a preferred embodiment according to the second technical means of the present invention.

Referring to FIG. 3, reference numeral 21 designates a reducing furnace, and reference numeral 22 designate two raw material supply ports provided at a lower portion of a side wall of the reducing furnace 21 and arranged symmetrically at two positions of the same level. An oxide raw material is supplied from the raw material supply ports 22 into the reducing furnace 21.

Reference numeral 23 designate two reductive gas supply ports distributed uniformly at the same level of the bottom of the reducing furnace 21. Further, a gas dispersing device 24 is provided at a reductive gas outlet of each reductive gas supply port 23. The gas dispersing device 24 is constructed of plural steel bars arranged in rows. A reductive gas is supplied from two reductive gas supply pipes 25 through the two reductive gas supply ports 23 into the preliminary reducing furnace 21. At this time, the reductive gas is sufficiently dispensed by the gas dispersing devices 24 provided at the reductive gas outlets of the reductive gas supply ports 23. Reference numeral 26 designates an extraction port for extracting a raw material falling from a fluidized bed in the reducing furnace 2.

According to the second technical means, at least two reductive gas supply ports are necessarily distributed uniformly at the same level of the bottom of the furnace, and a gas dispersing device is necessarily provided at a reductive gas outlet of each reductive gas supply port. It is to be noted that the number of the reductive gas supply ports and the structure of the gas dispersing device are not limited to those adopted in this preferred embodiment. The more the number of the reductive gas supply ports, the better the raw material and the reductive gas supplied are dispensed and mixed with each other. The number and the position of the reductive gas supply ports to be installed are suitably decided in consideration of a size of the furnace, for example. The gas dispersing device may be constructed of a punched plate or the like.

According to the second technical means, the reductive gas is supplied into the furnace from the plural reductive gas supply ports distributed uniformly at the same level of the bottom of the furnace. Accordingly, the dispersion and the mixing of the raw material and the reductive gas can be improved also in a large-sized fluidized bed reducing furnace.

The third technical means of the present invention comprises at least two upper reductive gas supply ports, at least two lower reductive gas supply ports, and at least two raw material supply ports provided at an intermediate level between a level of the upper reductive gas supply ports and a level of the lower reductive gas supply ports. With this construction, a raw material supplied from the raw material supply ports is fluidized by a reductive gas supplied from the lower reductive gas supply ports, and is then smoothly raised by a reductive gas supplied from the upper reductive gas supply ports. Furthermore, as all of the raw material supply ports, the upper reductive gas supply ports and the lower reductive gas supply ports are two or more, the raw material and the reductive gas can be completely dispensed and mixed with each other.

Figure 5:
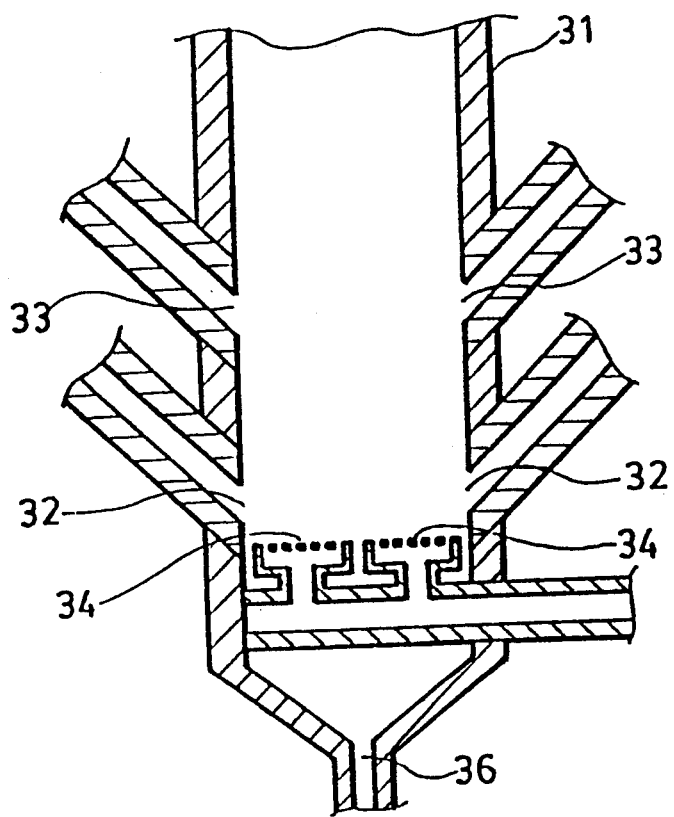
FIG. 5 is a vertical sectional view of a lower part of a preferred embodiment according to the third technical means of the present invention.

FIG. 5 is a vertical sectional view of a lower part of a preferred embodiment according to the third technical means of the present invention.

Referring to FIG. 5, reference numeral 31 designates a reducing furnace; reference numeral 33 designate two upper reductive gas supply ports; and reference numeral 34 designate two lower reductive gas supply ports. Each lower reductive gas supply port 34 is formed at its gas outlet with numerous small holes. A reductive gas is supplied from the upper and lower reductive gas supply ports 33 and 34 into the reducing furnace 31. Reference numerals 32 designate two raw material supply ports provided at an intermediate level between a level of the two upper reductive gas supply ports 33 and a level of the two lower reductive gas supply ports 34. An oxide raw material is supplied from the raw material supply ports 32. Reference numeral 36 designates an extraction port for extracting a raw material falling from a fluidized bed in the reducing furnace 31.

In this preferred embodiment, the raw material supplied from the raw material supply ports 32 into the furnace 31 is first fluidized by the reductive gas supplied from the lower reductive gas supply ports 34. Then, the raw material thus fluidized is smoothly raised by the reductive gas supplied from the upper reductive gas supply ports 33. Furthermore, as all of the raw material supply ports, the upper reductive gas supply ports and the lower reductive gas supply ports are two or more, the raw material and the reductive gas can be completely dispersed and mixed with each other.

According to the third technical means, at least two raw material supply ports are necessarily provided at an intermediate level between the level of at least two upper reductive gas supply ports and the level of at least two lower reductive gas supply ports. It is to be noted that the number, the position and the structure of the upper and lower reductive gas supply ports and the raw material supply ports to be installed are not limited to those adopted in this preferred embodiment. The more the number, and the more uniformly the positions of these ports, the better the raw material and the reductive gas supplied are dispersed and mixed with each other. The number and the position of these ports to be installed are suitably decided in consideration of a size of the furnace, for example.

The fourth technical means of the present invention comprises at least two raw material supply ports and at least two reductive gas supply ports provided below or above the raw material supply ports for supplying a reductive gas into a furnace as a swirling reductive gas. With this construction, the reductive gas is supplied from the plural reductive gas supply ports into the furnace as being swirled. A raw material is supplied from the plural raw material supply ports into the furnace while the reductive gas being swirled and raised in the furnace. Accordingly, the reductive gas and the raw material can be sufficiently dispersed an mixed with each other.

Figure 7:
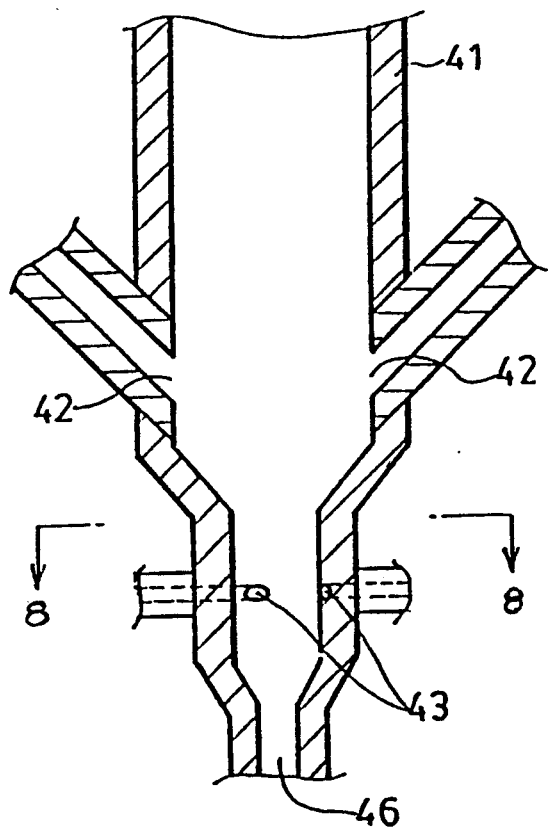
FIG. 7 is a vertical sectional view of a lower part of a preferred embodiment according to the fourth technical means of the present invention.
Figure 8:
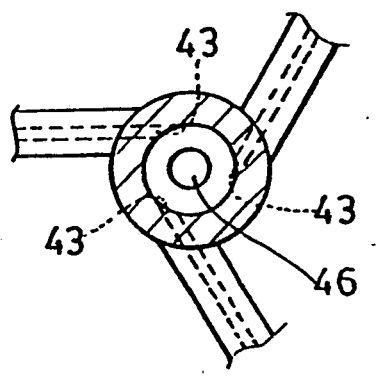
FIG. 8 is a cross section taken along the line A—A in FIG. 7.

FIG. 7 is a vertical sectional view of a lower part of a preferred embodiment according to the fourth technical means of the present invention, and FIG. 8 is a cross section taken along the line A—A in FIG. 7.

Referring to FIGS. 7 and 8, reference numeral 41 designates a reducing furnace, and reference numerals 42 designate two raw material supply ports provided at a lower portion of a side wall of the reducing furnace 41 and arranged symmetrically at two positions of the same level. An oxide raw material is supplied from the raw material supply ports 42 into the reducing furnace 41.

Reference numerals 43 designate three reductive gas supply ports provided at a portion of the side wall of the reducing furnace 41 below the raw material supply ports 42 and arranged at the same level so as to form a swirl of the reductive gas supplied into the furnace 41. Reference numeral 46 designates an extraction port for extracting a raw material falling from a fluidized bed in the reducing furnace 41.

In this preferred embodiment, the reductive gas is supplied from the plural reductive gas supply ports into the furnace as being swirled. As a result, the reductive gas supplied is swirled and raised in the furnace, and the raw material supplied from the plural raw material supply ports into the furnace is mixed into the swirled reductive gas raised in the furnace. Accordingly, the reductive gas and tile raw material can be sufficiently dispersed and mixed with each other. The raw material can be efficiently reduced by the reductive gas raising in the furnace.

Figure 9:
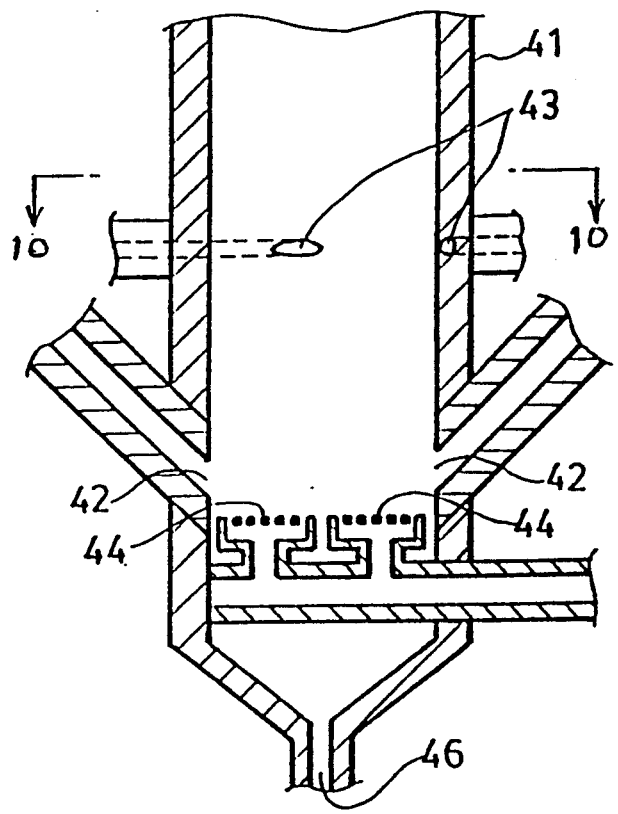
FIG. 9 is a vertical sectional view of a lower part of another preferred embodiment according to the fourth technical means of the present invention.
Figure 10:
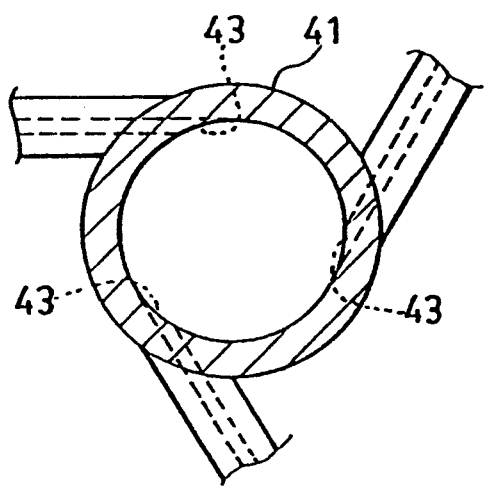
FIG. 10 is a cross section taken along the line B—B in FIG. 9.

FIG. 9 is a vertical sectional view of a lower part of another preferred embodiment according to the fourth technical means of the present invention, and FIG. 10 is a cross section taken along the line B—B in FIG. 9.

Referring to FIGS. 9 and 10, three reductive gas supply ports 43 for supplying a reductive gas and swirling the same are provided above the raw material supply ports 42. Further, two reductive gas supply ports 44 for supplying a reductive gas and forming a fluidized bed are provided below the raw material supply ports 42. Each reductive gas supply port 44 is formed at its gas outlet with numerous small holes.

In this preferred embodiment, the raw material is supplied from the plural raw material supply ports 42 into the reductive gas supplied from the plural reductive gas supply ports 44 to form a fluidized bed. On the other hand, the reductive gas supplied from the plural reductive gas supply ports 43 as being swirled is mixed into the fluidized bed in the furnace 41. Accordingly, the reductive gas and the raw material can be greatly efficiently dispersed and mixed with each other.

According to the fourth technical means, at least two swirled reductive gas supply ports are necessarily provided below or above at least two raw material supply ports. It is to be noted that the number and the position of the swirled reductive gas supply ports and the raw material supply ports to be installed are not limited to those adopted in the above preferred embodiments. The more the number of these ports and the more uniformly the positions of these pots are distributed, the better the raw material and the reductive gas supplied are dispersed and mixed with each other. The number and the position of these ports are suitably decided in consideration of a size of the furnace, for example.

Figure 2:
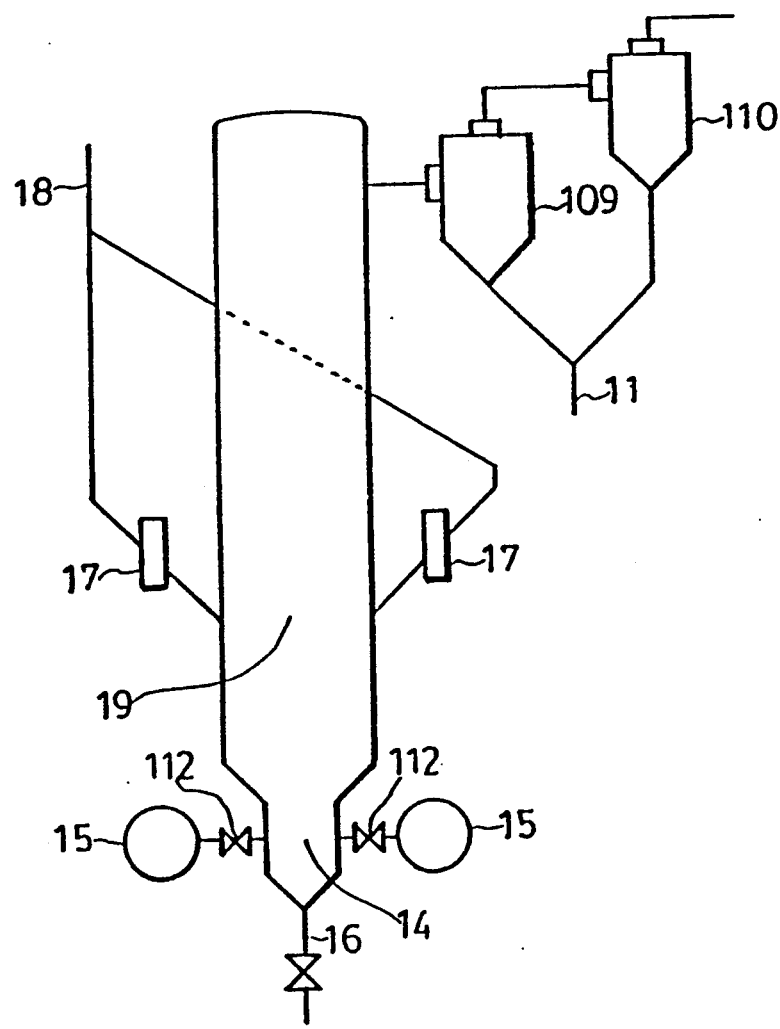
FIG. 2 is a flow diagram of a reducing system installing the preferred embodiment shown in FIG. 1.

There will now be described some examples of a preliminary reducing system installing the fluidized bed reducing furnace according to the present invention (1) The fluidized bed type preliminary reducing furnace according to the first technical means of the present invention as shown in FIG. 1 was installed into a reducing system as shown in FIG. 2.

The preliminary reducing furnace 11 employed has an inner diameter of 0.7 mm at the raw material supply section 19, an inner diameter of 0.2-0.3 m at the reductive gas supply section 14, and a total height of 7.3 m. Using a reductive gas having a composition of $(CO+H_2+N_2)$, a fine iron ore was preliminarily reduced at the rate of 600 kg/h.

The fine iron ore was supplied through an ore supply pipe 18 and two ore supply quantity regulating devices 17 into the raw material supply section 19 of the reducing furnace 11. On the other hand, the reductive gas was supplied through the reductive gas supply pipes 15 and two reductive gas quantity regulating devices 112 into the reductive gas supply section 14 of the reducing furnace 11. In the reducing furnace, the reductive gas was raised to fluidize the fine iron ore supplied and reduce the same.

A waste gas and the iron ore thus reduced were discharged from the furnace 11, and they were fed to cyclones 109 and 110 in this order to separate the reduced iron ore. Then, the waste gas was exhausted from the system. The reduced iron ore separated by the cyclones 109 and 110 was extracted from a product extraction pipe 111. On the other hand, the iron ore falling from the fluidized bed was extracted from the extraction port 16.

According to the above operation, an yield of the product was 90%, and a reduction rate was 55%.

As a comparison, by employing a fluidized bed type reducing furnace having a single ore supply port and a single reductive gas supply port with the other constructions unchanged, the reduction was carried out under the same operating conditions as those in the above example. In this case, an yield of the product was 60%, and a reduction rate was 40%.

As another comparison, by employing a fluidized bed reducing furnace having the same inner diameter at the reductive gas supply section 14 and the raw material supply section 19 with the other constructions unchanged, the reduction was carried out under the same operating conditions as those in the above example. In this case, a reduction rate was unchanged, and an yield of the product was 50%. Thus, it is apparent that the yield of the product in this example was improved by setting the inner diameter of the reductive gas supply section 14 to be smaller than the inner diameter of the raw material supply section 19.

Figure 4:
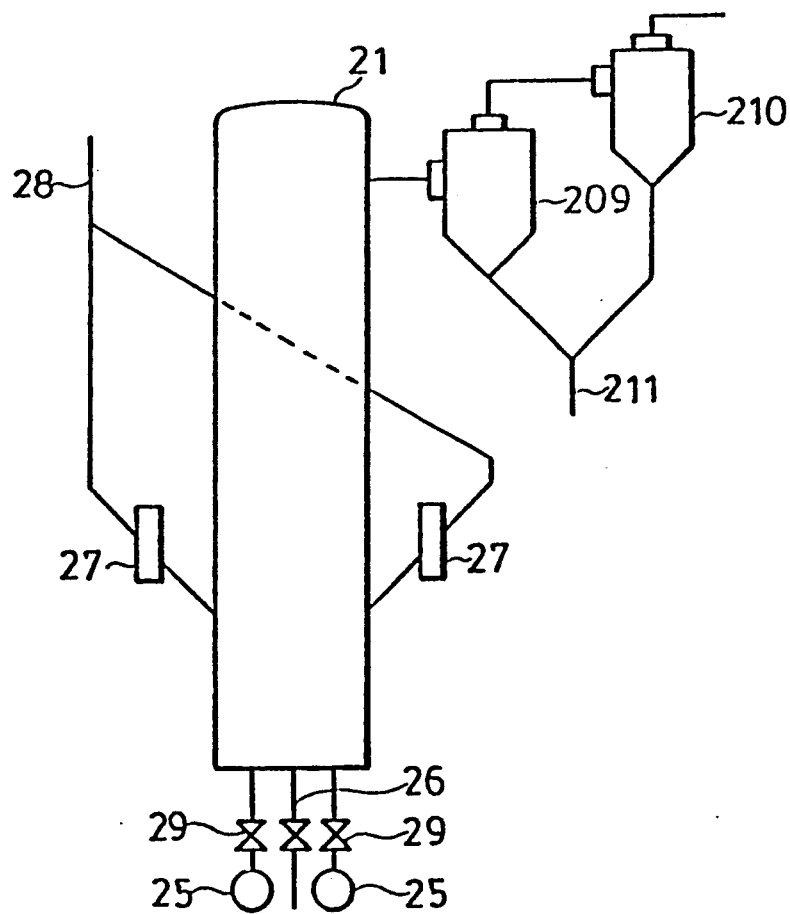
FIG. 4 is a flow diagram of a reducing system installing the preferred embodiment shown in FIG. 3.

(2) The fluidized bed reducing furnace according to the second technical means of the present invention as shown in FIG. 3 was installed into a reducing system as shown in FIG. 4.

The reducing furnace 21 employed has an inner diameter of 0.7 m and a total height of 7.3 m. Using a reductive gas having a composition of $(CO+H_2+N_2)$, a fine iron ore was reduced at the rate of 600 kg/h.

The fine iron ore was supplied through an ore supply pipe 28 and two ore supply quantity regulating devices 27 into the reducing furnace 21. On the other hand, the reductive gas was supplied through the reductive gas supply pipes 25 and two reductive gas quantity regulating devices 29 into the reducing furnace 21. In the reducing furnace 21, the reductive gas was raised to fluidize the fine iron ore supplied and reduce the same.

A waste gas and the iron ore thus reduced were discharged from the furnace 21, and they were fed to cyclones 209 and 210 in this order to separate the reduced iron ore. Then, the waste gas was exhausted from the system. The reduced iron ore separated by the cyclones 209 and 210 was extracted from a product extraction pipe 211. On the other hand, the iron ore falling from the fluidized bed was extracted from the extraction port 26.

According to the above operation, an yield of the product was 95%, and a preliminary reduction rate was 55%.

As a comparison, by employing a fluidized bed reducing furnace having a single reductive gas supply port with the other constructions unchanged, the reduction was carried out under the same operating conditions as those in the above example. In this case, an yield of the product was almost unchanged, and a reduction rate was 40%. Thus, it is apparent that the reduction rate was improved in this example was improved by providing two reductive gas supply ports.

Figure 6:
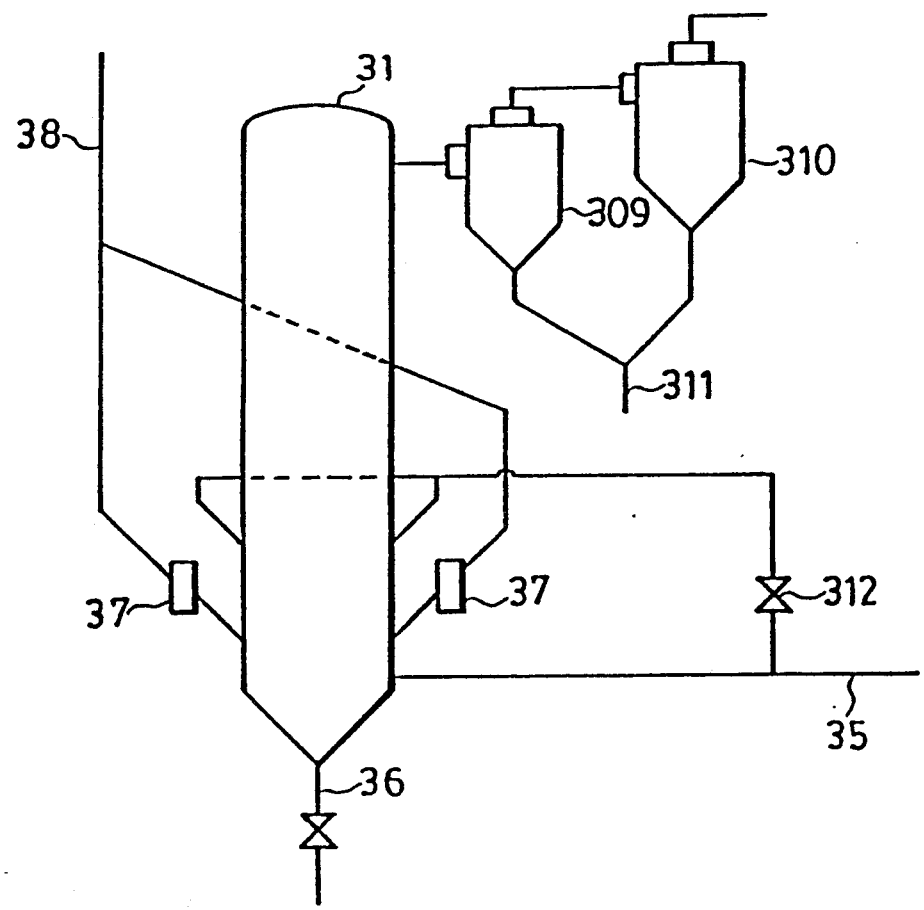
FIG. 6 is a flow diagram of a preliminary reducing system installing the preferred embodiment shown in FIG. 5.

(3) The fluidized bed type reducing furnace according to the third technical means of the present invention as shown in FIG. 5 was installed into a reducing system as shown in FIG. 6.

The reducing furnace 31 employed has an inner diameter of 0.7 m and a height of 7.3 m. Using a reductive gas having a composition of $(CO+H_2+N_2)$, a fine iron ore was reduced at the rate of 600 kg/h.

The fine iron ore was supplied through an ore supply pipe 38 and two ore supply quantity regulating devices 37 into the reducing furnace 31. On the other hand, the reductive gas was supplied through a reductive gas supply pipe 35, the upper reductive gas supply ports 33 and the lower reductive gas supply ports 34 into the reducing furnace 31. In the reducing furnace 31, the reductive gas was raised to fluidize the fine iron ore supplied and reduce the same.

Reference numeral 312 designates a reductive gas pressure regulating device for regulating a pressure of the reductive gas between the upper reductive gas supply ports 33 and the lower reductive gas supply ports 34.

A waste gas and the iron ore thus reduced were discharged from the furnace 31, and they were fed to cyclones 309 and 310 in this order to separate the reduced iron ore. Then, the waste gas wa exhausted from the system. The reduced iron ore separated by the cyclones 309 and 310 was extracted from a product extraction pipe 311. On the other hand, the iron ore falling from the fluidized bed was extracted from the extraction port 36.

According to the above operation, an yield of the product was 97%, and a reduction rate was 65%.

As a comparison, by employing a fluidized bed type preliminary reducing furnace having a single lower reductive gas supply port with the other constructions unchanged, the reduction was carried out under the same operating conditions as those in the above example. In this case, an yield of the product was 40%, and a reduction rate was unchanged. Thus, it is apparent that the yield of the product in this example was improved by providing the plural upper reductive gas supply ports and the plural lower reductive gas supply ports.

Figure 11:
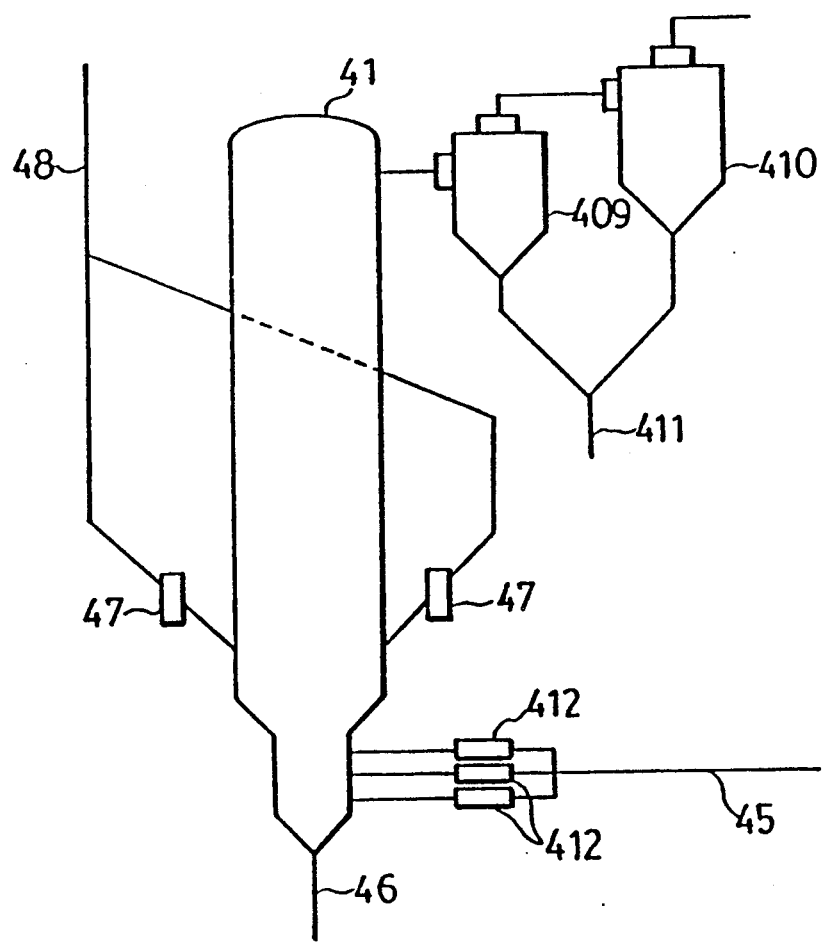
FIG. 11 is a flow diagram of a preliminary reducing system installing the preferred embodiment shown in FIG. 7.

(4) The fluidized bed reducing furnace according to the fourth technical means of the present invention as shown in FIG. 7 was installed into a preliminary reducing system as shown in FIG. 11.

The preliminary reducing furnace 41 employed has an inner diameter of 0.7 m at the raw material supply section, an inner diameter of 0.2–0.3 m at the reductive gas supply section, and a total height of 7.3 m. Using a reductive gas having a composition of ($CO+H_2+N_2$), a fine iron ore was preliminarily reduced at the rate of 600 kg/h.

The fine iron ore was supplied through an ore supply pipe 48 and two ore supply quantity regulating devices 47 into the raw material supply section of the reducing furnace 41. On the other hand, the reductive gas was supplied through a reductive gas supply pipe 45, three reductive gas quantity regulating devices 412 and the reductive gas supply ports 43 into the reductive gas supply section of the reducing furnace 41. In the reducing furnace 4, the reductive gas was swirled and raised to fluidize the fine iron ore supplied and reduce the same.

A waste gas and the iron ore thus reduced were discharged from the furnace 41, and they were fed to cyclones 409 and 410 in this under to separate the reduced iron ore. Then, the waste gas was exhausted from the system. The reduced iron ore separated by the cyclones 409 and 410 was extracted from a product extraction pipe 411. On the other hand, the iron ore falling from the fluidized bed was extracted from the extraction port 46.

According to the above operation, an yield of the product was 95%, and a reduction rate was 60%.

As a comparison, by employing a fluidized bed type reducing furnace having non-swirl type reductive gas supply ports with the other constructions unchanged, the reduction was carried out under the same operating conditions as those in the above example. In this case, an yield of the product was 40%, and a reduction rate was unchanged. Thus, it is apparent that the yield of the product in this example was improved by employing the reductive gas supply ports which generate a swirl.

We claim:

1. A fluidized bed reducing furnace for an oxide raw material comprising at least two raw material supply ports provided at a lower portion of a side wall of said furnace for supplying said raw material into said furnace, at least two reductive gas supply ports provided below said raw material supply ports for supplying a reductive gas into said furnace, and a reductive gas supply section of said furnace provided with said reductive gas supply ports, inner diameters of which are smaller than that of a raw material supply section of said furnace provided with said raw material supply ports.

2. A fluidized bed reducing furnace for an oxide raw material comprising at least two reductive gas supply ports provided at a bottom of said furnace and distributed uniformly at the same level for supplying a reductive gas into said furnace, and a gas dispersing device provided at a reductive gas outlet of each of said reductive gas supply ports.

3. A fluidized bed reducing furnace for an oxide raw material comprising at least two upper reductive gas supply ports provided at a lower portion of said furnace for supplying a reductive gas into said furnace, at least two lower reductive gas supply ports provided below said upper reductive gas supply ports for supplying said reductive gas into said furnace, and at least two raw material supply ports provided at an intermediate level between a level of said upper reductive gas supply ports and a level of said lower reductive gas supply ports for supplying said raw material into said furnace.

4. A fluidized bed reducing furnace comprising at least two raw material supply ports provided at a lower portion of a side wall of said furnace for supplying said raw material into said furnace, and at least two reductive gas supply ports provided below or above said raw material supply ports for supplying a reductive gas into said furnace in the form of a swirling reductive gas.

* * * * *